Jan. 10, 1961 R. MARMILLON 2,967,464
CLAMPS
Filed Aug. 27, 1959 4 Sheets-Sheet 4

United States Patent Office

2,967,464
Patented Jan. 10, 1961

2,967,464

CLAMPS

René Marmillon, Bizillon Le Haute-Saint Etienne, France, assignor to Commissariat a l'Energie Atomique, Paris, France, a company of France Filed Aug. 27, 1959, Ser. No. 836,388

Claims priority, application France Aug. 30, 1958

9 Claims. (Cl. 90—59)

The invention is concerned with improvements in or relating to clamps and more particularly clamps for positioning and gripping rods, blocks or the like which have to be accurately machined. It is concerned more especially, but not exclusively, with such devices intended to be used in machining graphite rods or bricks which are themselves intended for nuclear piles using the graphite as a retarder and reflector. It is known that these latter rods or bricks must be carefully machined and adjusted in very large numbers, and must comprise cavities intended to form the future ducts which will contain the uranium rods.

Such positioning and gripping devices are already known in themselves, and are rapid and reliable in operation, under pneumatic control. These devices comprise a horizontal jaw (that is to say giving a grip in a direction which is assumed to be horizontal) and a vertical jaw (that is to say giving a grip in a direction which is assumed to be vertical). Each of these two jaws tends to force each bar or block to be gripped against a "supporting plate" or the like, by way of at least one member called a "grip contact." Moreover, certain adjusting devices enable the invention to be used for positioning and gripping rods or the like which may vary in dimensions from one series to another.

Nevertheless, there is room for improvement in devices which may be already known in this field, for example to reduce the total bulk of the jaws and grip contacts in the longitudinal direction of the block or the like to be machined, or to reinforce certain properties of the said devices, such for example as their linked properties of accuracy, strength and speed, or again to make them operate more simply and reliably.

The invention has the purpose of providing positioning and gripping devices which may be more reliably and rapidly handled than hitherto known devices.

According to the present invention there is provided a clamp for a work piece comprising two support plates in planes normal to one another, a jaw in respect of each plate, each jaw being movable towards and away from its plate in a plane normal to the plane of that plate to grip a work piece between that jaw and its plate and being movable between an operative and an inoperative position by movement about an axis in that plane in which it moves towards and away from its plate, a first fluid operable piston being coupled to both jaws to effect movement of the jaws towards and away from their plates and a second fluid operable means being coupled to both jaws to effect movement of both jaws about said axis.

The movement of the jaws is preferably such that one jaw will abut the workpiece before the completion of movement of the other jaw towards the workpiece.

Preferably the axes of movement of the jaws towards and away from their plates lie in a common plane.

In order that the present invention may be well understood, there will now be described one embodiment thereof given by way of example only, reference being had to the accompanying drawings in which Figure 1 is an end view of a gripping device made in accordance with a method of embodiment of the various arrangements of the invention.

Figure 1:
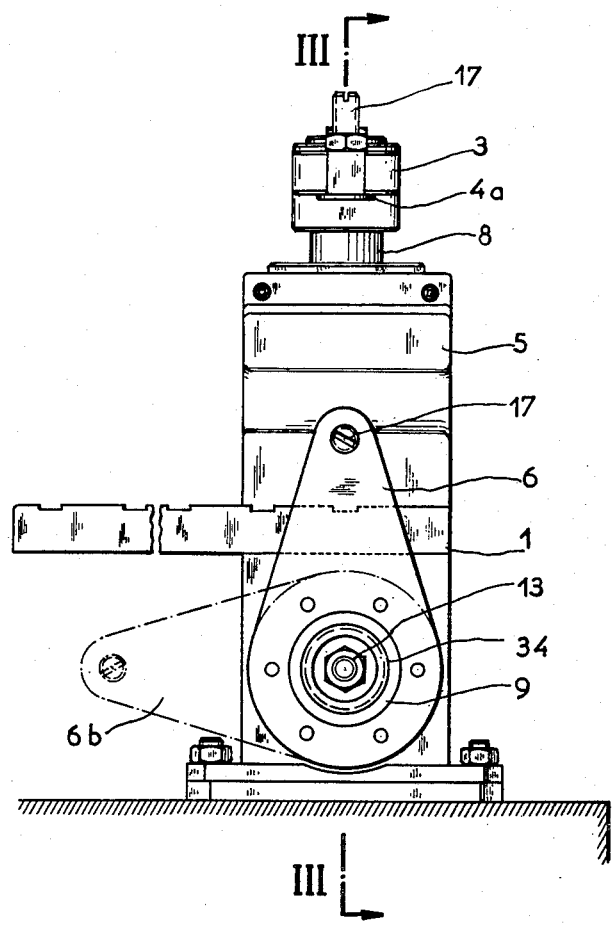
Figure 2:
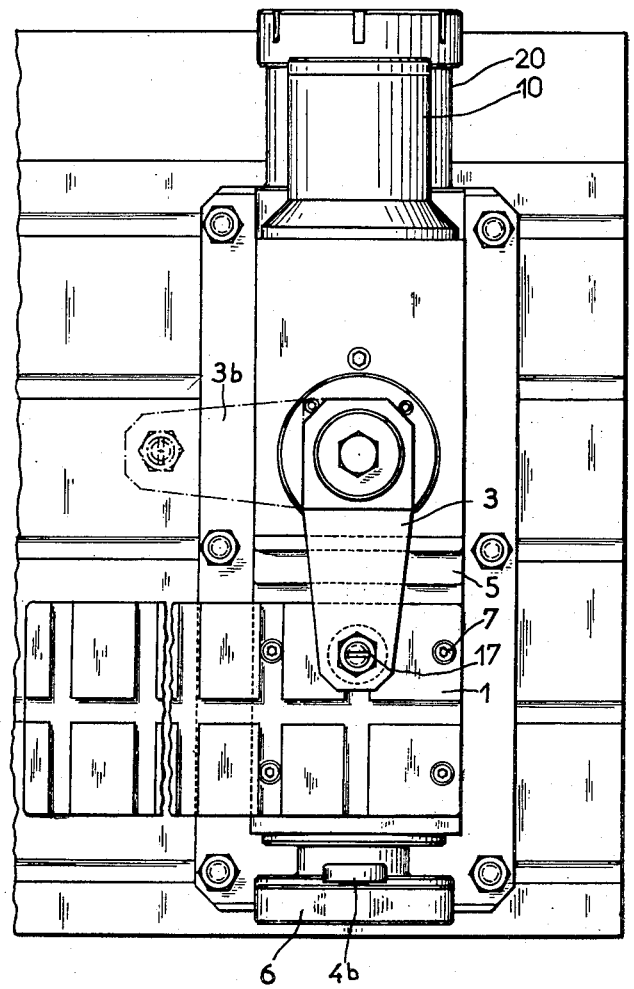
Figure 2 is a diagrammatic plan view of the gripping device in Figure 1.

The gripping device or assembly in Figures 1 to 5 comprises more particularly the following members:

A horizontal supporting plate 1 for the block or rod 2 which is intended to be positioned and gripped by the said device for machining purposes, the said block being hereinafter assumed to be a graphite block, in view of the fact that the invention seems as though it should be particularly advantageous in this case:

A jaw 3 called the "vertical jaw" which grips the block 2 in the vertical direction against the horizontal supporting plate 1, by way of a supporting member 4a called a "grip contact," but it must be stated straightaway that the vertical grip does not in fact come into action, when the device is being used, until after the horizontal grip operated by the so-called horizontal jaw to which reference is made below; and A vertical supporting plate 5 against which the graphite block 2 bears when it is gripped by the jaw 6 which is called the "horizontal jaw" which grips the block 2 in the horizontal sense by way of a "grip contact" 4b.

The two supporting plates 1 and 5, horizontal and vertical respectively, are detachable and are attached by screws such as 7, in order to allow similar plates of different dimensions to be placed in position, such plates being consequently adapted to the different dimensions and shapes of the rods or blocks to be machined.

As regards the arms which form a large part of the two jaws (horizontal arm designated in practice by the same reference number 3 as the so-called vertical jaw, and vertical arm designated in practice by the same reference number 6 as the so-called horizontal jaw), independently of the translational movements which may be imparted to them for gripping and releasing purposes as hereinafter defined, they are moreover fitted in partially rotatable fashion as follows: the arm 3 of the vertical jaw by rotation of a shaft or rod 8 upon which the arm is mounted at its base, the rotational axis being the vertical geometrical axis A—A, and the arm 6 of the horizontal jaw by rotation of a sleeve 9 to which the said arm is keyed, the rotational axis being the horizontal geometrical axis B—B.

The partial rotation which these two arms can thus carry out is intended to enable them to be withdrawn after a block or rod 2 has been machined, and before the following block for machining is placed in position, in order to free the trajectory of the said blocks while the device is being unloaded and loaded. Moreover, the angle of rotation is advantageously made 90° or of that order. As regards controlling this rotational withdrawal of the jaws, it is preferably done in mechanical fashion, the rotational movements of each of the two arms 3 and 6 being linked. The corresponding mechanism used in the example illustrated is described in detail later, but it may be stated at this juncture that it is actuated from a pneumatic cylinder 10.

With regard now to the translational movements of the jaws, for gripping and releasing purposes, they are made possible by the fact that this example is fitted up as a whole as follows:

On the longitudinal axis of the sleeve 9 to which the horizontal jaw 6 is attached there is an axial rod 11 which is partly hollow, and threaded at one end.

Round the said axial rod there is a first bush 13 which is internally threaded over part of its length and has a collar 13a at the end, and a second bush 14 with a collar 14a which is reversed with respect to 13a but opposite to the latter. A strong spring 15 is interposed between the collars 13a and 14a, and may be tightened with the aid of a nut and lock-nut 16a—16b. The whole is accommodated inside the sleeve 9.

These various parts serve to make a preliminary adjustment of the initial position of the horizontal jaw 6 in order to make it subsequently grip a block 2 whereof the dimensions are substantially known in advance. The following procedure is adopted for this: the spring 15 is compressed with the aid of the nuts 16a—16b so that the distance between similar faces of the bushes 13 and 14 is slightly less (the value advantageously being between one millimetre and a few tenths of a millimetre) than the free space left between the opposite faces of the sleeve 9 and the piece 34. It is moreover expedient for the force exerted by the spring 15 to be of the order of two hundred kilograms; the play thus left between the parts allows the sleeve 9 to rotate freely.

Another adjustment to be made before putting the device into operation is to the grip contacts 4a and 4b; they are each mounted on one of the threaded rods 17 which allow the contact in question to be placed at a suitable initial distance from the graphite block 2 for a given position of the corresponding jaw.

Nevertheless, as regards the grip contact 4b of the horizontal jaw 6, it is preferably adjusted in the initial position, before block 2 is gripped, by screwing up or unscrewing the bush 13 on the rod 11 after slackening the locking screw 12, so that, before the gripping operation mentioned below, the grip contact 4b is approximately five millimetres from the block 2, as also is the grip contact 4a with respect to another side of the said block.

The rod 11 is furthermore fast with the rod 18 of a piston 19 disposed in a control cylinder 20, pneumatic control being used in this case. To this end, the cylinder 20 comprises arrangements of a type well known in themselves, more particularly with inlet ports 21 or the like. It follows from this that, when pneumatic pressure is exerted on the piston 19 in the direction of the arrow 22a, the horizontal jaw 6 and the grip contact 4b are given a translational movement parallel to 22a, as indicated by the arrow 22b.

Moreover, between the piston rod 18 and the rod 11 which operates the jaw 6 there is a connection piece 23 whereof the movements are transmitted to the vertical jaw 3, so as to displace the latter in the direction of the arrow 22c, at the same time as the said connecting piece moves in the direction 22a.

To this end, the rod 8 which supports the vertical jaw 3 is so fitted as to be capable of sliding with respect to another portion of rod 24 on the same axis A—A as the rod 8. This sliding action is allowed by way of a bush 25, which is translationally fast with the rod 8 but can slide with respect to the portion of rod 24. This bush 25 is mechanically connected to the connecting piece 23 by a cranked lever 26 which is pivotally fitted about a pin 27, and whereof the ends engage in suitable fashion, one with the connecting piece 23 and the other with the bush 25. The arm of the said cranked lever which engages with the said bush is preferably shorter than the arm which engages with the connecting piece 23, for example in a ratio of the order of ¼. It follows from this on the one hand that, when the device takes a grip, the vertical grip contact 4a will move downwards more slowly than the horizontal grip contact 4b moves; and on the other hand that the force transmitted by the piston 19 to the vertical jaw 3 will be greater than that transmitted to the horizontal jaw 6.

This has the following consequences when a block 2 is gripped under pneumatic control from the cylinder 20; the block 2, first of all resting under the action of gravity on the horizontal supporting plate 1, is then gripped by the horizontal jaw 6 and its grip contact 4b against the vertical supporting plate 5, this being done, for example, with a gripping force of a hundred and sixty kilograms which is obtained (regard being had to the kinematics of the system, and to the various efficiencies) from a thrust of eight hundred and thirty kilograms on the part of the piston 19, to which an air pressure of the order of seven kilograms per square centimetre is then applied. A horizontal grip having thus been taken on the block 2, the vertical grip contact 4a nevertheless continues to move downwards until it in turn comes into contact with the block 2, and grips it with a force proportional to that of the lever arm 26, i.e., for example, an effective gripping force of approximately seven hundred kilograms. This is the way in which the movements as a whole are temporarily displaced, as mentioned above.

Figure 3:
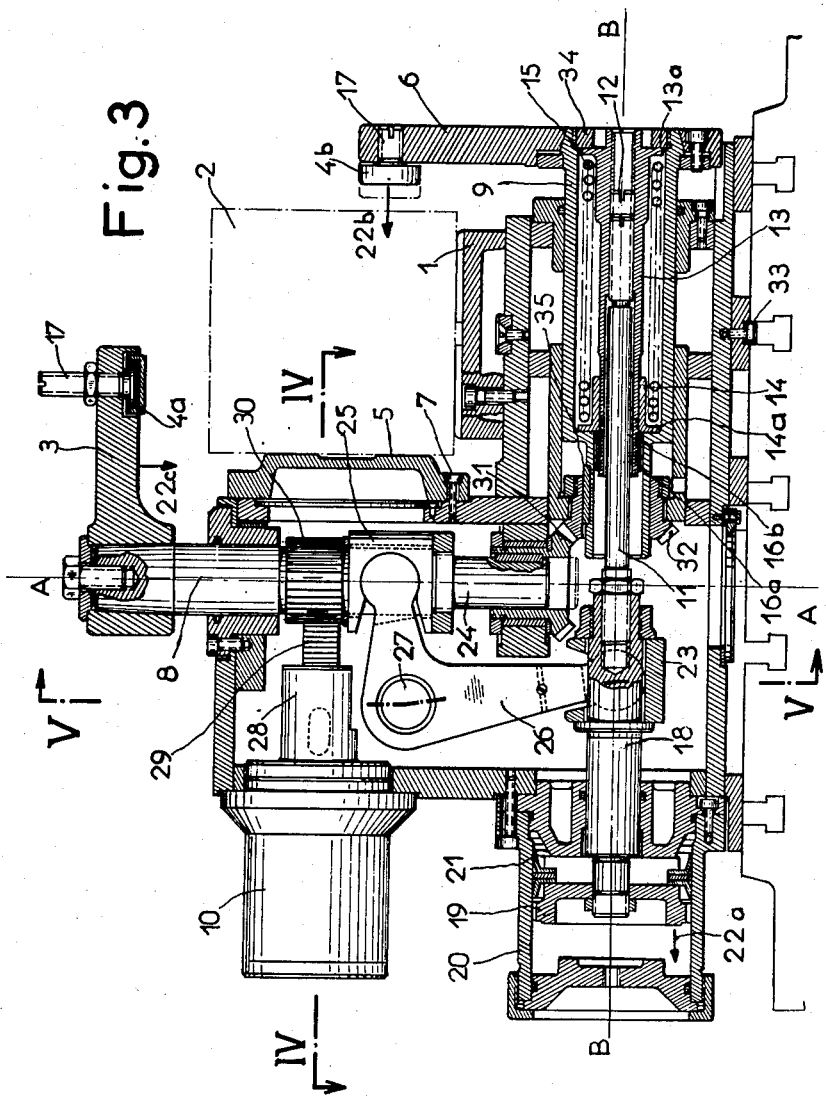
Figure 3 is a section along III—III of the same device in Figure 1.

The block 2, being thus gripped with great speed, accuracy and force, may then be machined by any suitable machine tool, for example a double end-milling machine, after which it is released by returning the jaws and grip contacts 4a and 4b to their initial position before gripping, which is the position illustrated in Figure 3. Release is effected by returning the piston 19 to its rest position, if required with opposing pneumatic inlet.

Another arrangement of the invention relates to mounting at least a large portion of each of the gripping jaws in rotatable fashion, more particularly in order to allow the jaws to be disengaged for the purpose of manipulating blocks to be gripped, such disengagement preferably being under pneumatic control, and linked for both jaws.

Figure 4:
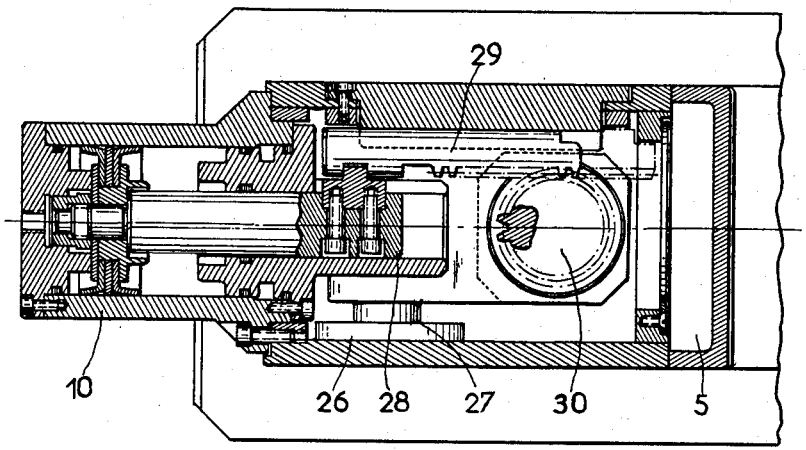
Figure 4 is a section along IV—IV of the device in Figure 3.
Figure 5:
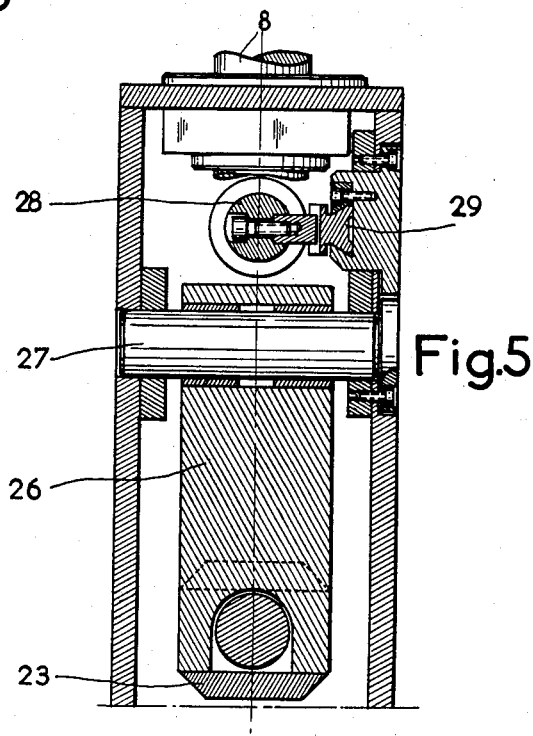
Figure 5 is a section along V—V of the device in Figure 3.

In this embodiment, control is effected from a pneumatic cylinder 10 (Figure 4), which has already been mentioned, and which may have an internal structure somewhat similar to that of the cylinder 20. Figures 1 and 4 also show the rod 28 of the piston 36 in this cylinder 10. This portion of rod 28 is followed by a rectilinear rack 29, which is held in position by the piece 37 screwed to the rod 28 by the screws 38 and 39. The rack 29 is in mesh with the spur pinion 30, which in Figure 3 is situated in front of the rack 29. This pinion is furthermore rotationally fast with the rod 8 of the vertical jaw 3. It follows from this that a suitable movement of the piston in the pneumatic cylinder 10 rotationally drives the said rod 8, together with the jaw 3, so that the latter is withdrawn. If the angle of rotation thus provided is 90°, which appears to be expedient in certain embodiments, the arm 3 of the vertical jaw, after withdrawal, is in the position illustrated in dashed line at 3b in Figure 2.

As regards the corresponding rotational movement of the horizontal jaw 6 for the purposes of comparable withdrawal, this is carried out with the aid of the following arrangement; the rod 8 associated with the vertical jaw 3 is rotationally fast with the portion of rod 24 situated below it. This rod 24 carries a bevel pinion 31 meshing with a similar bevel pinion 32, which is rotationally fast, by virtue of the key 35, with the sleeve 9 associated with the horizontal jaw 6. Displacement of the rack 29 thus rotationally drives the sleeve 9, together with the horizontal jaw 6, thus moving the latter from the position illustrated in full line in Figures 1, 2 and 3 to that illustrated in dashed line at 6b in Figure 1.

In other embodiments, the amplitude of rotational movement may moreover be less than 90°, for example in order to bring the grip contacts 4a and 4b into a starting position, before gripping, differing from that which they occupy in Figure 3, more particularly so that they bear against the block 2 at a relative point other than that which would result from the respective positions in Figure 3.

Whatever arrangement is adopted, the foregoing considerations lead to a device for positioning and gripping rods, blocks or the like which have to be accurately machined. In connection with this device, it will moreover be noted that it is advantageously so made that the mean geometrical axes of both jaws, horizontal and vertical, and/or the mean geometrical axes of both grip contacts 4a and 4b, are all situated in the same plane, which is vertical, or transverse with respect to the block 2 to be machined (that is to say in the case of Figure 3, in the plane of this figure).

Particular advantages follow from this arrangement, above all, when a large number of short graphite bricks (for example, about twenty centimetres long) has to be machined, which is the case in some atomic piles, and in any case the said arrangement makes the device much more flexible in use because it is much narrower than similar devices hitherto known.

Moreover, additional detail arrangements may be made, such for example as at least one key 33 (Figure 3), which ensures that the device is accurately positioned geometrically with respect to the slide-bars on the tables of machines on which machining is carried out.

What is claimed is:

1. A clamp for a work piece comprising two support plates in planes normal to one another, a jaw in respect of each plate, each jaw being movable towards and away from its plate in a plane normal to the plane of that plate to grip a work piece between that jaw and its plate and being movable between an operative and an inoperative position by movement about an axis in that plane in which it moves towards and away from its plate, a first fluid operable piston being coupled to both jaws to effect movement of the jaws towards and away from their plates and a second fluid operable means being coupled to both jaws to effect movement of both jaws about said axis.

2. A clamp according to claim 1 in which the axes of movement of the jaws towards and away from their plates lie in a common plane.

3. A clamp according to claim 1 in which the axes about which the jaws are movable are normal with respect to each other and lie in the same plane.

4. A clamp according to claim 3 in which the axes lie in a plane in which both jaws are movable towards and away from their plates.

5. A clamp according to claim 1 in which the means coupling the first piston to the jaws is adapted to allow one jaw to abut the work piece and complete its movement before completion of the movement of the other jaw.

6. A clamp according to claim 1 in which the means coupling the first piston to the jaws comprises a direct coupling between the piston and one jaw and a bell crank having one end pivotally coupled to the direct coupling and the other end coupled to the second jaw.

7. A clamp according to claim 6 in which one arm of the bell crank is of greater length than the other and the longer arm being coupled to the direct coupling which is telescopic whereby the directly coupled jaw may abut a work piece before the other jaw has completed its movement.

8. A clamp according to any of the preceding claims in which the second fluid operable means comprise a piston coupled to a rack, the pinion of which is coupled to the jaws to provide movement of the jaws about the said axes.

9. A clamp according to claim 8 in which the pinion is coupled to a rod coaxial with the said axis about which one jaw is movable, the rod being coupled by bevel gears to a member coupled to the other jaw and coaxial with the said axis about which that other jaw is movable.

References Cited in the file of this patent

UNITED STATES PATENTS 1,729,076    Laycock _____ Sept. 24, 1929